US010680995B1

United States Patent
Hinkle et al.

(10) Patent No.: US 10,680,995 B1
(45) Date of Patent: Jun. 9, 2020

(54) CONTINUOUS MULTIMODAL COMMUNICATION AND RECORDING SYSTEM WITH AUTOMATIC TRANSMUTATION OF AUDIO AND TEXTUAL CONTENT

(71) Applicants: Christopher Winson Hinkle, Oakland, CA (US); Abel Learned Lenz, Brooklyn, NY (US)

(72) Inventors: Christopher Winson Hinkle, Oakland, CA (US); Abel Learned Lenz, Brooklyn, NY (US)

(73) Assignee: Racket, Inc., Oakland, CA (US)

( * ) Notice: Subject to any disclaimer, the term of this patent is extended or adjusted under 35 U.S.C. 154(b) by 143 days.

(21) Appl. No.: 16/011,020

(22) Filed: Jun. 18, 2018

Related U.S. Application Data

(60) Provisional application No. 62/526,122, filed on Jun. 28, 2017.

(51) Int. Cl.
| | | |
|---|---|---|
| *G06F 15/16* | (2006.01) | |
| *H04L 12/58* | (2006.01) | |
| *H04L 12/18* | (2006.01) | |
| *H04L 29/06* | (2006.01) | |

(52) U.S. Cl.
CPC .......... *H04L 51/36* (2013.01); *H04L 12/1813* (2013.01); *H04L 51/10* (2013.01); *H04L 65/403* (2013.01)

(58) Field of Classification Search
USPC .................. 709/204, 201, 202, 206, 207
See application file for complete search history.

(56) References Cited

U.S. PATENT DOCUMENTS

| | | | | |
|---|---|---|---|---|
| 2004/0064762 A1* | 4/2004 | Deshpande | ......... | G06F 11/0733 714/44 |
| 2007/0286101 A1* | 12/2007 | Gagne | ................. | H04L 12/1818 370/260 |
| 2013/0218947 A1* | 8/2013 | Zur | ........................ | G06Q 10/06 709/203 |
| 2014/0280530 A1* | 9/2014 | Fremlin | ................ | H04L 67/306 709/204 |
| 2015/0381552 A1* | 12/2015 | Vijay | ...................... | H04L 51/32 709/206 |
| 2018/0278504 A1* | 9/2018 | Alazraki | ............. | H04L 12/1822 |

\* cited by examiner

*Primary Examiner* — Lan Dai T Truong
(74) *Attorney, Agent, or Firm* — Muirhead and Saturnelli, LLC

(57) ABSTRACT

Providing interactive communication between a plurality of members includes providing a routing and redistribution module that communicatively connects each of the members with each of the other members and allows the members to receive at least real-time audio data from other ones of the members. Providing the interactive communication also includes receiving content from at least one of the members, selectively distributing the content to at least some of the members in real-time, selectively storing at least some of the content, and visually indicating temporal relationships between different types of the content to at least one of the members. The content includes text messages, images, documents, graphical emojis, stickers, animated gifs, audio emojis, recorded audio, recorded video, real-time audio, and/or real-time video. Distribution of the content to a particular one of the members varies according to a listening state of the particular one of the members.

26 Claims, 4 Drawing Sheets

CONTINUOUS MULTIMODAL COMMUNICATION AND RECORDING SYSTEM WITH AUTOMATIC TRANSMUTATION OF AUDIO AND TEXTUAL CONTENT

CROSS-REFERENCE TO RELATED APPLICATIONS

This application claims priority to U.S. Prov. App. No. 62/526,122, filed on Jun. 28, 2017, and entitled "CONTINUOUS MULTIMODAL COMMUNICATION AND RECORDING SYSTEM AND METHOD", which is incorporated herein by reference.

TECHNICAL FIELD

This application is directed to the field of mobile multimedia messaging applications, and more particularly to continuous multimodal communication system with automatic transmutation of audio and textual content.

BACKGROUND OF THE INVENTION

Mobile devices, software and services occupy a growing share of everyday lives of billions of people. According to 2018 market statistics, there are over five billion users of mobile Internet. US users spend over five hours per day on mobile devices. Not surprisingly, mobile online traffic exceeds 50% of the overall Internet traffic and users spend over 69% of their Internet time on smartphones—over 70% of that Internet time is spent on mobile applications. Mobile influenced online spending has already exceeded one trillion dollars; in particular, 90% of smartphone owners use their phone while making purchasing decisions in brick and mortar stores.

Mobile communications have been one of the top five mobile application categories for a long while. According to market research, in 2017, mobile messaging applications have hit a new milestone: over 75% of the world's smartphone owners have used at least one such application. On each of the two most popular platforms, Android and iOS, the number of smartphone owners who are using messaging applications on a monthly basis exceeds 50%. It is estimated that, by the end of 2017, 1.82 billion people worldwide regularly used messaging applications, a 15.5% annual increase. This number is expected to increase to almost 2.5 billion users of mobile messaging applications by 2021.

Top mobile messaging applications significantly vary from region to region and from country to country. The list of top ten global mobile messaging applications starts with the WhatsApp with 1.5 billion users, followed by the Facebook Messenger with 1.3 billion users, and ends with Snapchat, LINE and Telegram with 200-250 million users each. The US picture is quite different, where the Facebook Messenger (over 103M users) leads by more than a 2:1 margin over the second place Snapchat, while the WhatsApp occupies the third place with less than 20 million users. In China, WeChat is by far the most popular messaging application, while Viber dominates the mobile messaging space in Ukraine.

At the core of mobile messaging applications is a very limited standard set of features: texting, including peer-to-peer and group chat, voice and video calls, photo and file sharing, and contact management. In contemporary mobile messaging applications, this basic feature set is greatly expanded and may include advanced security attributes, including end-to-end encryption and time-limited, self-destroying content; expressive features, such as emoticons, emojis and extensive libraries of stickers; user and friend discovery; extensive content libraries; social and gaming features; embedded maps and geo-positioning enhancements; in-product marketing and e-commerce, etc.

Notwithstanding a significant progress in the development and proliferation of mobile messaging applications on all significant platforms, functioning of the mobile messaging applications, especially some of the voice related features, invite significant improvements. The basic mobile voice messaging metaphor is built around conventional calls and is split into distinct sessions, where each session requires a manual connection by a caller, often takes a significant time before the session starts and also necessitates a manual disconnection to end the call. User interface for group voice messaging is under-developed and does not include clear visualization of status, activity levels, and contribution of each call participant. Replay features for a majority of mobile messaging applications are limited to basic scrolling back and forth through the history of conversations and don't include replay of voice calls. Most mobile messaging applications don't include custom content delivery in a desired format when, for example, some of the users are driving a car and cannot follow text chat or any visual communications. Some other features of voice messaging are sub-standard, such as a voice duplication when several call participants are located in proximity and hear both the immediate speech and a delayed replica of the speech through the messaging channel. In other words, there is no single messaging space for mobile multimedia communications.

Accordingly, it is desirable to create a continuous communication application that combines seamless multimodal communications with automatic delivery of content to each user in a preferred media type.

SUMMARY OF THE INVENTION

According to the system described herein, providing interactive communication between a plurality of members includes providing a routing and redistribution module that communicatively connects each of the members with each of the other members and allows the members to receive at least real-time audio data from other ones of the members, receiving content from at least one of the members, wherein the content includes text messages, images, documents, graphical emojis, stickers, animated gifs, audio emojis, recorded audio, recorded video, real-time audio, and/or real-time video, selectively distributing the content to at least some of the members in real-time, where distribution of the content to a particular one of the members varies according to a listening state of the particular one of the members, selectively storing at least some of the content, and visually indicating temporal relationships between different types of the content to at least one of the members. A visual indication of the temporal relationships between different types of the content may be provided for the content that is selectively distributed to at least some of the members as the content is being generated. At least some of the content that is selectively stored may be distributed to at least some of the members after the content has been stored. A visual indication of the temporal relationships between different types of the content may be provided for the content that is selectively distributed to at least some of the members after the content has been stored. Selectively distributing the content to at least some of the members in real-time may include muting real-time audio distribution from a first member to a second member in response to the first member being in close physical proximity to the second member. The members may be communicatively connected by at least one channel that maintains continuous communication between the members to allow content to be sent on the channel by a member at any time. A predictive algorithm may optimize a real-time connection between the members by predicting when the members will communicate synchronously based at least on metadata corresponding to each of the members. The predictive algorithm may establish a real-time connection between the members prior to the members communicating with each other. The predictive algorithm may be a trained model. The metadata may include member location, ambient sonic environment, proximity to other members, a device type of each of the members, temperature, mobility of each of the members, battery level, data network environment, cellular reception characteristics, barometric pressure, and/or ambient light. In response to a first one of the members and a second one of the members opening a client application that accesses the channel, connecting listening devices to devices of the first and second members, experiencing relatively low ambient background noise, and having a previous history of communicating at a particular time, the predictive algorithm may establish a real-time connection between the first and second members. The predictive algorithm may disconnect the first and second members in response to the first and second members not using the real-time connection. A type of content provided to a particular member may depend on a type of device the particular member is using and on preferences set by the particular member. The type of device of the particular member may be a mobile phone, a wearable device, a smart headphone device, a portable device with a combination of personal audio output and input, a smart speaker, a smart TV, a tablet computing device, a desktop computer, a notebook computer, a set-top box, a game console, and/or an audio and video conferencing system. Real-time audio provided as content by each of the members may be converted to text that is delivered as content to at least some of the members and may be stored. Text provided as content by each of the members may be converted to audio that is delivered as content to at least some of the members and may be stored. A subset of members having devices with visual capability may be provided with a visual representation of participation indicating when each of the members was listening and when each of the members was speaking and the visual representation may show content that is being added to the visual representation as the synchronous content is being generated and may include asynchronous content that is added to the visual representation at any time after being generated. The visual representation may correspond to a line for each of the members with different segments of the line representing different times and a first segment corresponding to a range of time that a particular one of the members was not listening may be visually different than a second segment corresponding to a range of time that the particular one of the members was listening. The visual representation may correspond to a line for each of the members with different segments of the line representing different times and a first segment corresponding to a range of time that a particular one of the members was not speaking may be different than a second segment corresponding to a range of time that the particular one of the members was speaking. At least one of the members may add content while some of the members are speaking and listening. Icons that represent different types of content may be superimposed on the visual representation of participation. The icons may represent text messages, images, documents and/or audio emojis. The audio emojis may visually and audibly represent attitudinal and emotive information corresponding to real-time audio content. The visual representation of participation may be manipulated by the member to play back portions of a real-time audio conversation and portions of the content corresponding to text messages, images, documents and/or audio emojis. The visual representation of participation may be manipulated by the member to play back portions of a real-time audio conversation using at least some of the content that is stored. At least a portion of real-time audio conversation that is played back may be viewed as text that had been converted from real-time audio input. At least a portion of real-time audio conversation that is played back may be supplemented by audio information corresponding to text that had been input during the conversation and converted from text to audio content. Selectively storing at least some of the content may include storing documents, video recordings, audio recordings, text messages, metadata generated by the members, real-time audio that is converted to text, and/or text provided that is converted to audio data.

According further to the system described herein, a non-transitory computer-readable medium contains software that provides interactive communication between a plurality of members. The software includes a routing and redistribution module that communicatively connects each of the members with each of the other members and allows the members to receive at least real-time audio data from other ones of the members, executable code that receives content from at least one of the members, wherein the content includes at least one of: text messages, images, documents, graphical emojis, stickers, animated gifs, audio emojis, recorded audio, recorded video, real-time audio, and real-time video, executable code that selectively distributes the content to at least some of the members in real-time, wherein distribution of the content to a particular one of the members varies according to a listening state of the particular one of the members, executable code that selectively stores at least some of the content, and executable code that visually indicates temporal relationships between different types of the content to at least one of the members. A visual indication of the temporal relationships between different types of the content may be provided for the content that is selectively distributed to at least some of the members as the content is being generated. At least some of the content that is selectively stored may be distributed to at least some of the members after the content has been stored. A visual indication of the temporal relationships between different types of the content may be provided for the content that is selectively distributed to at least some of the members after the content has been stored. Selectively distributing the content to at least some of the members in real-time may include muting real-time audio distribution from a first member to a second member in response to the first member being in close physical proximity to the second member. The members may be communicatively connected by at least one channel that maintains continuous communication between the members to allow content to be sent on the channel by a member at any time. A predictive algorithm may optimize a real-time connection between the members by predicting when the members will communicate synchronously based at least on metadata corresponding to each of the members. The predictive algorithm may establish a real-time connection between the members prior to the members communicating with each other. The predictive algorithm may be a trained model. The metadata may include member location, ambient sonic environment, proximity to other members, a device type of each of the members, temperature, mobility of each of the members, battery level, data network environment, cellular reception characteristics, barometric pressure, and/or ambient light. In response to a first one of the members and a second one of the members opening a client application that accesses the channel, connecting listening devices to devices of the first and second members, experiencing relatively low ambient background noise, and having a previous history of communicating at a particular time, the predictive algorithm may establish a real-time connection between the first and second members. The predictive algorithm may disconnect the first and second members in response to the first and second members not using the real-time connection. A type of content provided to a particular member may depend on a type of device the particular member is using and on preferences set by the particular member. The type of device of the particular member may be a mobile phone, a wearable device, a smart headphone device, a portable device with a combination of personal audio output and input, a smart speaker, a smart TV, a tablet computing device, a desktop computer, a notebook computer, a set-top box, a game console, and/or an audio and video conferencing system. Real-time audio provided as content by each of the members may be converted to text that is delivered as content to at least some of the members and may be stored. Text provided as content by each of the members may be converted to audio that is delivered as content to at least some of the members and may be stored. A subset of members having devices with visual capability may be provided with a visual representation of participation indicating when each of the members was listening and when each of the members was speaking and the visual representation may show content that is being added to the visual representation as the synchronous content is being generated and may include asynchronous content that is added to the visual representation at any time after being generated. The visual representation may correspond to a line for each of the members with different segments of the line representing different times and a first segment corresponding to a range of time that a particular one of the members was not listening may be visually different than a second segment corresponding to a range of time that the particular one of the members was listening. The visual representation may correspond to a line for each of the members with different segments of the line representing different times and a first segment corresponding to a range of time that a particular one of the members was not speaking may be different than a second segment corresponding to a range of time that the particular one of the members was speaking. At least one of the members may add content while some of the members are speaking and listening. Icons that represent different types of content may be superimposed on the visual representation of participation. The icons may represent text messages, images, documents and/or audio emojis. The audio emojis may visually and audibly represent attitudinal and emotive information corresponding to real-time audio content. The visual representation of participation may be manipulated by the member to play back portions of a real-time audio conversation and portions of the content corresponding to text messages, images, documents and/or audio emojis. The visual representation of participation may be manipulated by the member to play back portions of a real-time audio conversation using at least some of the content that is stored. At least a portion of real-time audio conversation that is played back may be viewed as text that had been converted from real-time audio input. At least a portion of real-time audio conversation that is played back may be supplemented by audio information corresponding to text that had been input during the conversation and converted from text to audio content. Selectively storing at least some of the content may include storing documents, video recordings, audio recordings, text messages, metadata generated by the members, real-time audio that is converted to text, and/or text provided that is converted to audio data.

The system described herein combines features of a conventional group messaging system with features of a real-time audio communication system (aka telephony), along with functional adjustments and additions to both in order to produce a continuous multimodal communication and recording system.

The system includes software applications running on a variety of client devices described as client software and software running on various configurations of internet-connected servers and cloud services collectively described as the server. Examples of client devices may include, but are not limited to, mobile phone, wearable devices such as smart watches, hearables (smart headphones or other portable devices with a combination of personal audio output and input), smart speaker, smart TV, tablet computing devices, desktop and notebook computers, set-top boxes, game consoles, audio and video conferencing systems, which are designed for one or more people in a shared space to communicate with others remotely via audio and/or video, or other devices with like or similar capability. Video conferencing systems often include multiple components combined ad hoc. Depending on the capabilities of the client device, certain aspects of the client software may function differently to accommodate device limitations. A nonlimiting example includes a subset of capabilities controlled by voice commands on devices such as hearables that do not have visual displays.

The system described herein is organized into channels which are exclusive to a set of users invited to participate in each channel, described as channel members. Each channel receives content and redistributes the content to the other channel members. A selective notification system makes channel members aware when new content and real-time connections are available per the preferences of the channel members. Notifications are delivered via client software. The respective notification systems may be available via visual, audible, haptic means or a combination thereof on each operating system running on a client device. Preferences for notifications set up by default and potentially customized by channel members may include limiting notifications to individual devices or types of devices and setting notification priority of devices and priorities of different types of notifications on individual devices.

Channel content may consist of text messages, images, documents (including but not limited to text, PDF, word processing documents, spreadsheets), graphical emojis, stickers, animated gifs, audio emojis, recorded audio and video, and real-time audio and video. All content received and distributed may also be saved to the server for subsequent review, sometimes called rewinding or replay. Periods of channel communications where one or more users enters real-time VOIP/video communication mode are called conversations.

Unlike conventional real-time communication systems, connections in the system described herein are established by a predictive algorithm optimized to connect a VOIP/video stream between users just before the users want to speak to one another. The system described herein allows each user to instantly enter a conversation without experiencing a lag of network connection routing. The client software periodically collects metadata from the client device and transmits the metadata to the server. Metadata collected may include, but is not limited to, location, ambient sonic environment, proximity to other users and channel members (as determined, for example, by iBeacons, Bluetooth analysis, or other means), device type, temperature, mobility (based on indications of accelerometers, gyroscopes or other sensors), battery level, data network environment, cellular reception characteristics, barometric pressure, and ambient light. Metadata may be pre-processed on a client device and/or a server. A predictive module on the server and/or client device may continuously monitor the metadata received from channel users and, based on a trained model or other algorithm, may attempt to establish a real-time VOIP/video connection just before a user makes an explicit connection request. For example, it is possible to have a background establishment of a real-time VOIP/video connection when two users (i) have both opened a client application; (ii) are both connected to WIFI hotspots; (iii) have connected listening devices such as headphones; (iv) have low ambient background noise; and (v) have a previous history of conversations at a time of day on a particular day of the week from present locations of the users. It is also possible to predictively disconnect connections that have gone unused based on timing and/or changes observed in user metadata.

Instead of a single CONNECT or CALL button, the system may employ separate switches for listen and talk on each channel. Engaging a listen switch signals a listen status to the other channel members via a notification system. Regardless of how many channel members have switched on a listen mode, a conversation may not begin until one or more members has switched on a talk mode and a real-time VOIP/video connection has been established for all users. Listen and/or talk may be engaged on multiple channels simultaneously. Users may play audio from other audio applications on the same client device (such as a music or podcast application) while the users have a listen mode selected in one or more channels. Audio from other audio applications may only be interrupted for a particular channel member when a conversation begins. In this way, users may signal themselves as ready for conversation but continue with to work uninterrupted until one or more channel members decides to start a conversation. Based on user preference, a talk switch on a given channel may be engaged automatically when an other channel member first engages a talk switch; alternatively, the talk switch may be engaged via voice command or gesture (tap, swipe, long press on a control surface or motion interpreted by cameras) as supported by the type of client device; both options allow for conversations to commence hands-free.

As an example, a channel may be used to host a meeting while participating channel members turn on listen one by one until a last arriving member engages a talk mode and starts a conversation. In this example, the meeting may begin when a quorum is reached, does not interfere with any other tasks performed by the channel members, and does not require any other form of messaging to communicate readiness. In another example, certain channel members may turn on a listen mode on a channel to signal that the members are available for conversation should other channel members so desire. This example is similar to working in physical proximity to another co-worker in that conversations may occur instantly on an ad-hoc basis, without the social and technical negotiation typical to conventional voice communications.

In addition to signaling availability and preparing for a conversation, when a user engages a listen switch, the user will also begin to hear content contributions to the channel. Text messages contributed by channel members may be played out loud using speech synthesis (text-to-speech conversion), audio emoji sounds may be audible, and document uploads and other content contributions may trigger audio notifications. In this way, a user may keep track of one or more channels over audio without having to view the system client application on a screen. When a text message arrives in the channel and the listen mode is engaged, speech synthesis may be employed to read the identity of the contributor and/or the content of the message out loud. In an embodiment, the system may employ a trained model to synthesize a voice that is identical to or similar to but recognizably different from that of a contributing user. When playing content contributions aloud as described above, any audio playing on a device of the user may be momentarily lowered in volume (called ducking), then returned to a previous full volume when playback is complete. For example, a user may engage a listen switch on a channel that the user wishes to monitor and then stows a client device being used for communication while driving. In this way the user is available for immediate voice communications and is aware of the presence and content of all channel contributions without the need to gaze toward or interact with a screen of the client device. Some or all of different types of content contribution audio described herein may be suppressed based on user preferences.

When a user engages a talk switch, the microphone of the user may become active and a pre-connected VOIP/video channel may begin transmitting real-time audio/video currently present in the channel. In addition to real-time audio/video transmission, a voice activity detector module in client software may detect when the user begins speaking and may use an algorithm or trained model to break the speech into segments. The audio segments may further be saved as audio files on a client device and transcribed into text on the client device or via transmission to a cloud-based transcription service (speech-to-text technology, or voice recognition). Both the audio file and the transcription may be uploaded to a server. In this way the system is able to store specific audio contributions from each user in a high-quality format that is free from degradation by network conditions. This ensures that the conversation is reliably recorded, and that each transcription is accurately attributed.

A notification system may provide visual and audible information about a user and about channel events, conversation status, and system status. When the user has switched on a listen mode in a channel, audio notifications may indicate when other channel members switch the listen mode on or off and when a conversation begins and ends. Some of the audio notifications may consist of brief multi-part chimes, which may indicate both a type of event (such as when a channel member has turned on the listen mode) and which specific user (identified by a unique user tone-signature) had triggered the event. Additionally, a periodically repeating notification sequence may play during conversations to indicate a total number of channel members currently listening. Audio notifications may be personalized to each user and may not be broadcast over a VOIP/video channel but rather, are mixed into an audio stream of each individual user by client software. Notifications may be delivered in a timely fashion but not necessarily at the moment the notifications are received. A module in the client software may use a trained model to predict when small gaps in the conversation will occur and may delay notifications to avoid interruptions in a conversation. The model may learn from speaking patterns of a user and speaking patterns of the other channel member that converse with the user. In this way, audio notifications may be customized to be less disruptive than notifications on conventional conference call services.

The client software may accept voice commands when the software is disconnected, when the listen mode is engaged for one or more channels, and when in conversation on one or more channels. Commands accepted may vary between these states. A switch between states or other system events may cause the client software to pre-empt the client device operating system and become a sole listener for voice commands. For example, when a user has a listen switch but not the talk switch engaged on a channel that starts a conversation, the client software may enable a microphone for voice commands but suppress passing speech of the user from the mic audio of the user to the channel. When a talk is engaged for a channel and a user issues a voice command, part or all of the commands may be removed from saved audio segments and subsequent transcription and/or muted from the live VOIP/video connection. In this way other channel members may be less disrupted when a user invokes voice commands.

A system module may also analyze device metadata to determine when channel members are in close proximity during a conversation and may selectively mute VOIP reception of speech by users who are close enough to be heard in person. Metadata collected may include but is not limited to location, ambient sonic environment, proximity to other users and channel members (as determined, for example, by iBeacons or Bluetooth analysis), device type, temperature, mobility (accelerometer, gyroscope or other sensors), and other metadata listed above. A predictive module on a server and/or client may continuously monitor the metadata received from channel users and may use a trained model or other algorithm to determine when users are close enough to clearly hear each other's voices. In this way, two channel members who are listening and talking on the same channel may be able to avoid an echo effect caused by first hearing the other speak in person, followed milliseconds later by transmitted audio from the real-time VOIP/video connection.

Audio emojis may be represented visually in the channel timeline and audibly to users that have a listen mode switched on in a channel that receives such emojis. Each audio emoji may have a specific icon (for users who are able to visually follow a channel conversation) and a specific accompanying sound. In written language, emojis may be used to compensate for an absence of paralinguistic characteristics which aid in communicating attitudinal and emotive information. In addition, emojis may be used as shorthand to communicate complex concepts with emotional components in a very small number of characters. Adding an audio component to certain emojis makes it possible for a listener to receive in an audio format emotional and attitudinal content conveyed by users without viewing a screen. By introducing audio emojis related to common communication patterns of beginning and ending conversations, as well as collaborating throughout a conversation, channel members may be able to communicate more efficiently with the same or better emotional fidelity. Additionally, audio emojis may serve as nuanced place markers in a conversation, making it easy to find notable parts when rewinding.

For example, a user may send a kitchen timer audio emoji which makes a brief tic-toc sound to indicate that the user had to leave the conversation but will return momentarily. In this instance, the audio emoji improves the efficiency of communication because the audio emoji does not require the user to interrupt other speakers to announce that the user is leaving, nor does the audio emoji risk an additional uncertainty arising from an assumption that a network problem has caused the user to leave. In this instance, an audio emoji also improves emotional effectiveness of communication by clarifying that the user is leaving for an expected reason and that the user intends to return, thus avoiding any awkwardness or insult potentially introduced when interjecting into ongoing speech by another user.

In another example, each time a channel member makes a rhetorical argument that stands out for forcefulness, accuracy, or elegance, of the argument, another channel member may send a bowling strike emoji which depicts a bowling ball hitting bowling pins and plays a corresponding sound. This may allow channel members to go back through the conversation when the conversation is over and quickly review specific moments where the emoji was played in order to document corresponding statements for further use. Similarly, speakers may use audio emojis to mark decision points or unanswered questions and action items.

On client devices with visual displays, channels may be viewed in the client software through a channel timeline. Sections of the timeline may alternate between two display modes depending on status of a conversation: conventional mode or conversation mode. When there is no real-time audio or video connection (conventional mode), new items in the timeline appear in a conventional messaging format as text, images, documents, emojis, etc., with attribution to each contributing channel member and a timestamp. For a duration of a conversation, however, audio is recorded and presented in a conversation mode section of the timeline, also called a multimodal voice-centric channel pane, where speech from each participating channel member appears as a vertical audio stream called a lane, and other contributions such as text messages, documents and audio emojis are represented as icons. A lane of a channel member indicates where in the conversation the member was speaking. By including both normal and conversation modes in the same timeline in chronological order, it is possible for a channel member to simply scroll up in order to see and replay past conversations, messages, documents, etc. in an order that the past conversations, messages, documents, etc. were contributed, regardless of modality. This differs from and improves upon conventional messaging systems and voice/video communication recording software because it makes all of the content related to the topic of the channel available in one place in a chronological order all of the content was created.

The status of each channel member in a multimodal voice-centric channel pane may be indicated both by attributes of the lane and by decoration of an avatar of a member, which may be displayed on top of the screen or elsewhere above each lane. Thus, a thick line representing a particular lane and a frame around an avatar corresponding to listening or speaking modes may indicate an active participation of a channel member in a conversation. In case of a speaking channel member, a small microphone badge may also decorate the avatar. A thin line and a frame around an avatar corresponding to a contributing but non-listening mode may indicate a channel member who is not listening to a conversation but is aware of the conversation and may contribute, for example, text messages or images related to a previous fragment of corresponding communications. Also, a member absent from a channel at a time of a conversation may be shown by a thin line in a multimodal channel pane and a frame around the avatar of the user may be absent or the avatar itself may be shown in a grayed out manner.

A module in client software may employ a paralinguistic analysis to apply visual highlights to audio segments that are likely to be most relevant for playback. Paralinguistic characteristics of speech contribute to the emotive and attitudinal quality of an utterance. By highlighting audio segments with exceptional attitudinal and/or emotive content, the module of paralinguistic analysis may make it easier for users who are rewinding a conversation to find relevant content, particularly in longer conversations. The module analyzes characteristics of speech such as prosody (intonation, tone, stress, and rhythm), pitch, pitch contour, volume, breathing, and the frequency and category of non-lingual vocalizations. The module may use a combination of configurable thresholds, algorithmic analysis, and analysis by a trained model to identify audio segments and groups of audio segments that appear absolutely and/or relatively outside of norms for speech in general, the speech of channel members, and the speech of a specific channel member. Norms may be determined absolutely or relative to an individual conversation and/or past conversations on a same channel or other related channels (such as channels that speakers in the present conversation have spoken on previously).

When scrolling through a conversation mode portion of a timeline (rewinding), a play head may appear above the lanes and allow a channel member to select a position in the conversation to begin playback. As the user scrolls across the conversation, transcription of speech adjacent to the play head may be displayed visually in an overlay, effectively allowing the user to skim the conversation in writing to select a point to commence audio playback. The ability to see the transcription of audio contributions in this fashion makes it possible to keep abreast of the content of the conversation without listening to the audio. The play head may also allow a channel member to roll over icons for text, audio emoji, and document contributions and show content of documents visually when adjacent to the play head.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for establishing a continuous multimodal communication environment with a multiplicity of channels allowing an always-on one-on-one and group text, voice, video, and multimedia messaging with user contribution, processing and distribution of various types of content.

Figure 1:
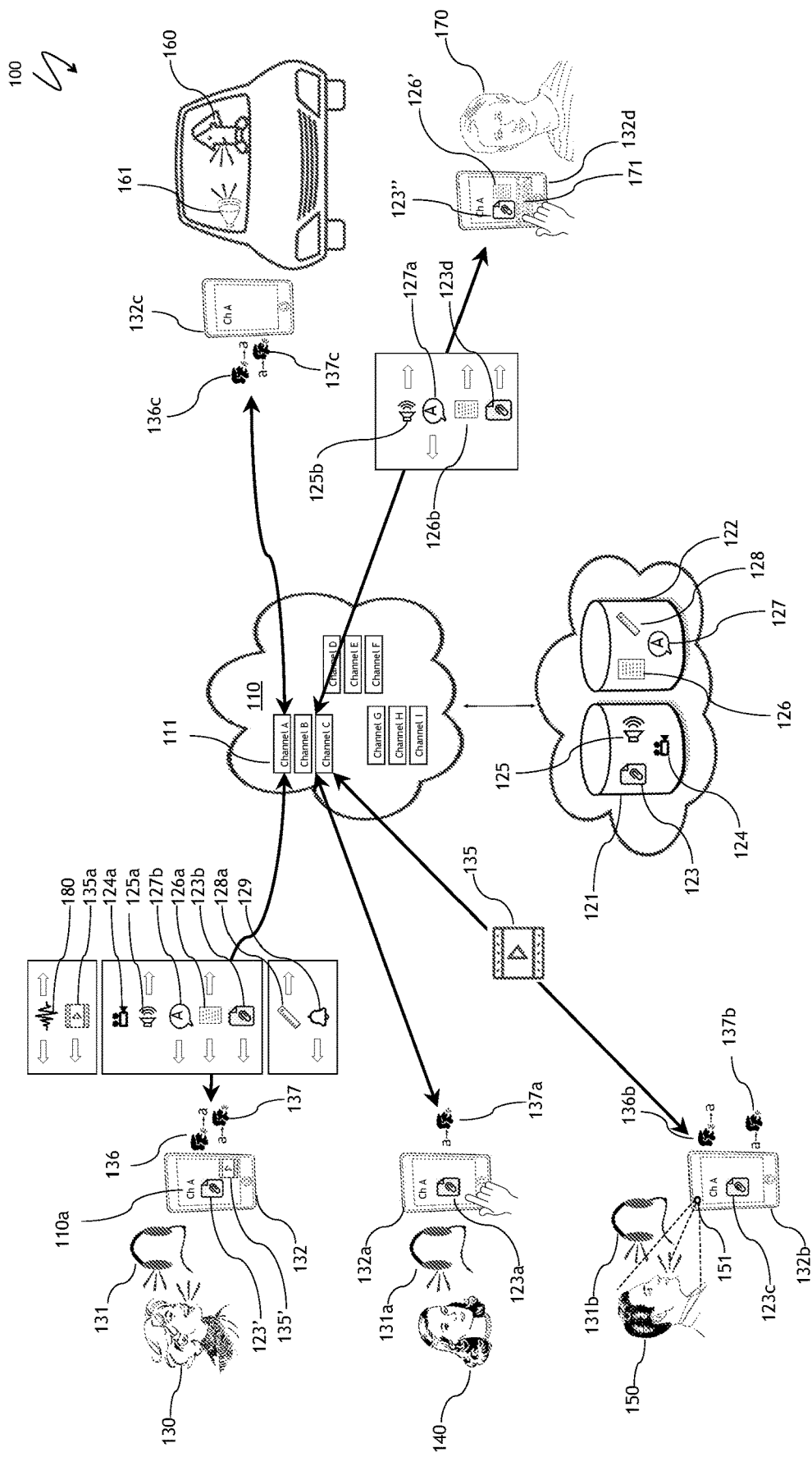
FIG. 1 is a schematic illustration of system architecture, according to an embodiment of the system described herein.

FIG. 1 is a schematic illustration 100 of the continuous multimodal communication system described herein. A cloud-based routing and redistribution module 110 connects five active channel members 130, 140, 150, 160, 170 on a channel 111 (Channel A, one in a group of channels). The routing and redistribution module 110 receives content from each of the members 130, 140, 150, 160, 170 and redistributes the content to other ones of the members 130, 140, 150, 160, 170, then stores the content to a cloud storage module 121 or to a cloud database module 122 depending on a type of the content. The cloud storage module 121 stores uploaded documents 123, video recordings 124 and audio recordings 125. The cloud database module 122 stores automatic voice transcriptions 126, text messages 127 and metadata 128. The routing and redistribution module 110 also receives metadata from each of the members 130, 140, 150, 160, 170 that is independent of whether each of the members 130, 140, 150, 160, 170 is presently active or not. The routing and redistribution module 110 applies some processing to the metadata, and continuously stores the metadata to the cloud database module 122. The routing and redistribution module 110 may also issue notifications 129 to each of the members 130, 140, 150, 160, 170 based on actions or on metadata from other ones of the members 130, 140, 150, 160, 170 or based on server-triggered events.

The illustration 100 shows the member 130 using headphones 131 with a built-in microphone connected to a smartphone client device 132, running the client software. The member 130 is listening and speaking over a real-time VOIP audio connection 180 on Channel A (discussed above) that is being displayed 110a on a screen of the device 132 of the member 130. Channel A is also being received by the members 140, 150, 160. The client software recognizes when the channel member 130 is speaking and records portions of audio when the channel member 130 is speaking to audio files on the client device 132 to provide corresponding audio files. The audio files may be transcribed by an automatic speech recognition module 136 in the client software to produce a transcription text 126a; the audio files 125a and transcription text file 126a are sent through the routing and redistribution module 110 to appropriate storage modules, as described elsewhere herein. Additionally, the member 130 may receive streamed video 135a (also displayed on the screen of the device 132 as an item 135'), video recordings 124a, text messages (a message 127b has arrived from the member 170, as explained below), which may be read aloud to the member 130 using a text-to-speech module 137. The member 130 may also view data from other ones of the members 140, 150, 160, 170, including transcriptions of talking audio segments (shown as an item 126a with a left-pointing arrow near the item 126a), documents 123b (also displayed on the device 132 as an item 123'), created or contributed by another one of the members 140, 150, 160, 170, as explained elsewhere herein, including the accompanying text, as described elsewhere herein. Furthermore, metadata 128a from the device 132 may be continuously collected by the system and transferred to the server, and the notifications 129 may be delivered to the member 130 and played on the client device 132, according to customization and preferences, as explained elsewhere herein.

The illustration 100 shows the member 140 is listening to a real-time VOIP audio connection on Channel A through headphones 131a connected to a client device 132a of the member 140 running the client software. A microphone of the client device 132a is switched off and the member 140 is not speaking. The member 140 contributes to the conversation by uploading a document 123a that was requested by another one of the members 130, 150, 160, 170. The document 123a may be routed to the cloud storage module 121 and then immediately redistributed to the members 130, 150, 160, 170 shown as items 123b, 123', 123c, 123d, 123''. Although a client device 132c of the member 160 does not have a display activated because the member 160 is driving and the client device 132c may be stowed, the document 123a may be downloaded to the client device 132c and saved for instant access at a later time; a notification sound may be played to the member 160 indicating that the document 132c has been received.

The member 150 may be using headphones 131b with a built-in microphone connected to the client device 132b, running the client software. The member 150 may be listening and speaking over a real-time VOIP audio connection on Channel A, which is being received by the members 130, 140, 160. The member 150 also has a camera 151 switched on and is broadcasting video over a real-time video connection 135 to the member 130 who has elected to view the corresponding video stream, as indicated by items 135a, 135'. The client software recognizes when the member 150 is speaking and records those portions of audio when the member 150 is speaking to audio files on the client device (not shown in FIG. 1). The audio files may be transcribed by an automatic speech recognition module using client software 136b and the audio files to provide transcriptions (also not shown in FIG. 1) that may be sent through the routing and redistribution module 110 to appropriate storage modules, as described elsewhere herein.

The member 160 has connected a smartphone client device 132c running the client software to an automotive speakerphone system 161. The member 160 is listening and speaking over a real-time VOIP audio connection on Channel A, which is being received by the members 130, 140, 150. The client software recognizes when the member 160 is speaking and records portions of audio when the member 160 is speaking to audio files on the client device 132c. The audio files are transcribed by an automatic speech recognition module 136c in the client software and the audio files and transcriptions are sent through the routing and redistribution module 110 to appropriate storage modules, as described elsewhere herein. Additionally, a text-to-speech module 137c may synthesize audio representations of text messages and read the audio representations of text messages aloud, as explained elsewhere herein (see, for example, items 127a, 137, 137a, 137b, 137c in this FIG. 1).

The member 170 is not connected in real-time on audio or video and does not receive audio or video streams 180, 135. The member 170 has just become active on Channel A on a mobile phone client device 132d which has loaded all recent audio 125b, transcriptions 126b (shown as a transcription 126' on a screen of the client device 132d), and documents 123d, 123'' for the channel (Channel A) including items from the present conversation. The member 170 scrolls through a channel display reading portions of the transcription 126' and viewing the uploaded document 123''. The member 170 may opt to answer a question asked during the conversation via a text message which the member 170 types using a keyboard 171 of the device 132d. A text message 127a of the member 170 is delivered to other ones of the members 130, 140, 150, 160, and may be synthesized into speech by the text to speech modules 137, 137a-137c in the client software and mixed in to audio streams of the other ones of the members 130, 140, 150, 160, which is illustrated by the item 127b as an input to the member 130.

Figure 2:
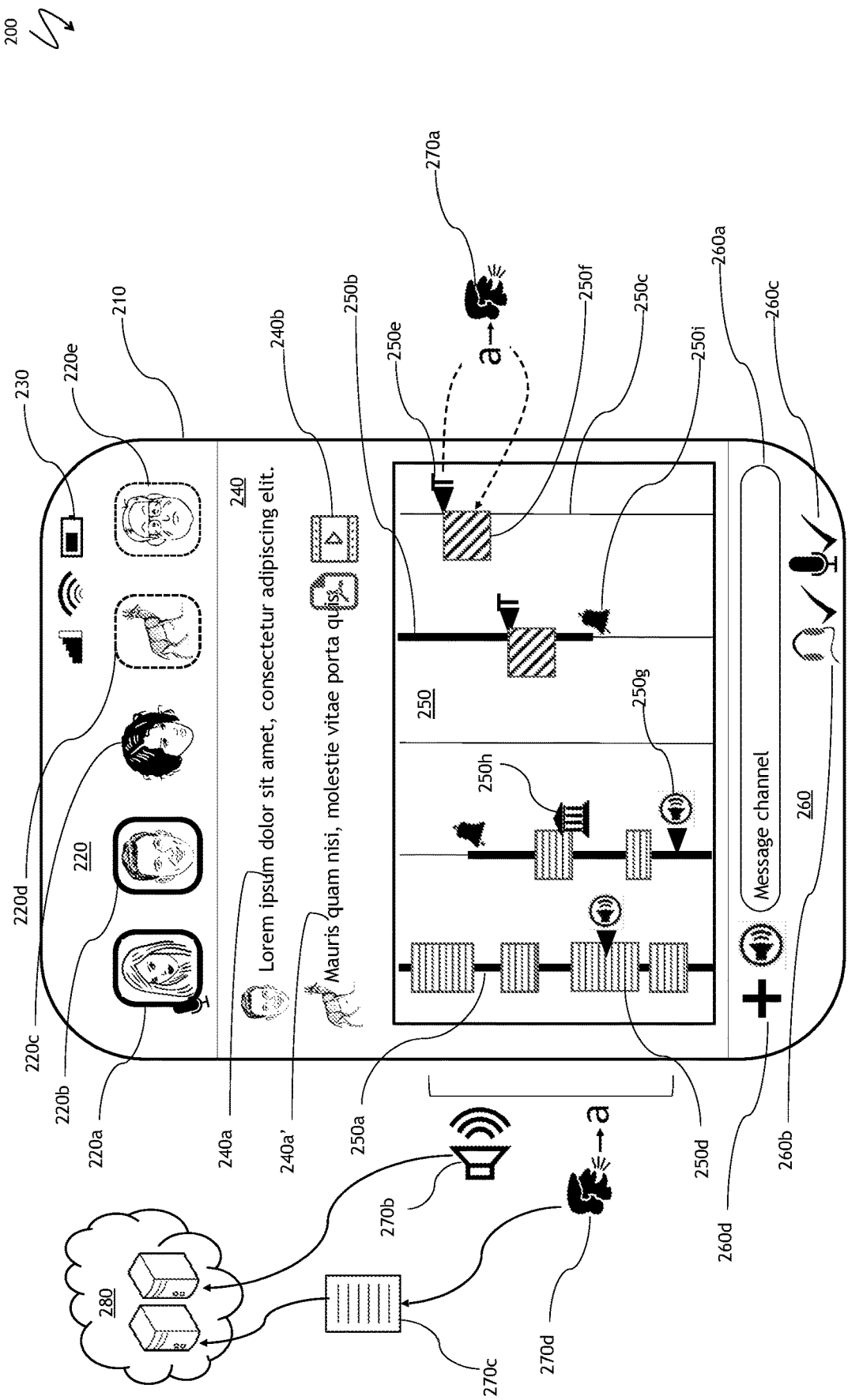
FIG. 2 is a schematic illustration of a channel display with a multimodal voice-centric channel pane, according to an embodiment of the system described herein.

FIG. 2 is a schematic illustration 200 of a channel display with a multimodal voice-centric channel pane. A channel display 210 includes a channel member and status area 220 with hardware and network indicators 230, a conventional messaging area 240, a multimodal voice-centric channel pane 250 and an input and control area 260. Note that, while the FIG. 2 shows one alternation between a conventional messaging area and a multimodal voice-centric channel pane, the two areas that are representing respectively the conventional and the real-time messaging modes may each appear multiple times on the channel timeline during the use of a channel.

The channel member area 220 includes avatars of two listening channel members 220a, 220b. The member 220a may be an owner of a device showing the channel display 210 and may do most of the speaking. A speaking status of the member 220a is indicated by a small microphone badge at a bottom portion of the avatar frame and by a double-line status frame around avatars (which may be color coded, for example, as a yellow frame). The double-line status frame may correspond to an ON status of a listening control button 260b and a speaking control button 260c. The channel member 220b is shown adding short comments and eventually turns off the speaking button but the listening status (while the member 220a is speaking) is also highlighted by a double frame. In contrast, a member 220c is shown not participating in the current session at all and an offline status of that member is indicated to the rest of the communicating members in the channel by a thin line in a lane of the member 220c and by the absence of a status frame. A member 220d is indicated as initially listening to the talk but eventually switching off the listening button, which is shown by a change from a bold line to a thin line in a lane of the member 220d. A member 220e is not listening to the conversation between the three other members 220a, 220b, 220d but contributes to the discussion with text messages, as explained below; an avatar for the member 220e is enclosed in a dashed frame, indicating non-listening.

The conventional messaging area 240 includes two text messages 240a, 240a' by two channel members, one of which Is accompanied by attachments 240b, which may be, for example, a PDF and a video file, as illustrated by the item 240b.

The multimodal voice-centric channel pane 250 may be opened when one or more channel members activates a speaking capability (a control 260c) after previously enabling a listening feature (a control 260b). The pane 250 includes multiple lanes, that is, channel member multimodal timelines, one per channel member, that may be categorized as follows: an active lane 250a where the channel member is listening and/or talking for the full duration of the conversation; a partially active lane 250b, where a channel member is listening for part of the time, either joining a listening/talking mode midway or leaving the listening/talking mode during the talk (possibly entering and leaving the listening mode multiple time through the lifetime of the current pane 250); and an inactive lane 250c where a channel member is not listening to voice communications but may contribute to the discussion with text or other non-voice media.

Fragments 250d of user talk may be directly displayed on each talking channel lane of each member as a voice signal. Both talking and listening users or non-listening users may send text messages to the channel, which are displayed as markers 250e at a time of arrival. The text messages may be instantly converted into speech using a text-to-voice feature 270*a* and read aloud as illustrated by a voice fragment 250*f*.

Any channel member may also insert audio emojis 250*g* of any type and at any time, as explained elsewhere herein. Channel members may also attach images and documents during their talk or at any other time, shown as thumbnails 250*h* in the lane of the member 220*b*. When the member 220*a* enters or leaves a voice conversation by switching on or off the listening mode, brief notification tunes 250*i* may be played to all listening members.

The input and control area 260 includes a text input area 260*a*, two voice controls for listening 260*b* and for speaking 260*c* and two attachment controls 260*d* that allow adding audio emojis or any file (image, video, document, etc.) from the device currently used by a channel member.

Voice contributions, also known as audio segments (such as shown on the active lane 250*a*), may be recorded as an audio file 270*b* and converted into a text file 270*c* using a speech-to-text (voice recognition) feature 270*d*; both the audio file 270*b* and the text file 270*c* may be saved to the cloud storage 280.

Figure 3:
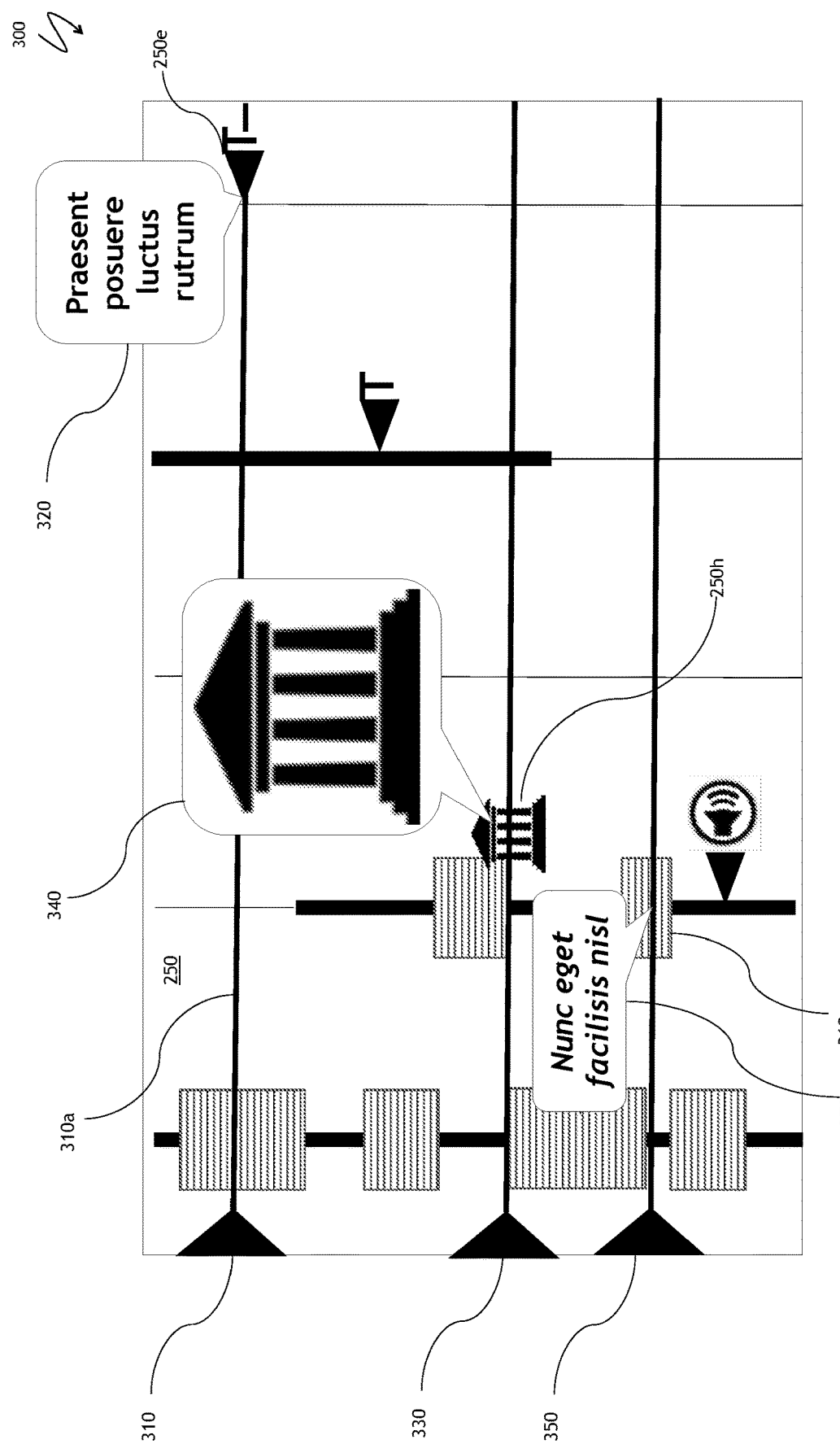
FIG. 3 is a schematic illustration of a rewind of communications history in the voice-centric channel pane, according to an embodiment of the system described herein.

FIG. 3 is a schematic illustration 300 of a rewind of communications history in the voice-centric multimodal channel pane 250. As a channel member moves a play head 310 across the pane 250, a ruler 310*a* of the play head 310 follows voice stream and various marks of additional data types communicated on the lanes, as explained elsewhere herein (see FIG. 2 and the corresponding description for details). For example, when the ruler 310*a* aligns with the marker 250*e*, which corresponds to a text message, a popup text window 320 may display the text message. At a next position 330, when the play head 310 aligns with a thumbnail 250*h* of an image posted by a channel member, a full-size image 340 may be rendered on a screen of a channel member. Subsequently, when the play head 310 occupies a position 350 in the pane 250 corresponding to a speaking fragment 360 for one of the channel members, another popup window 370 with a text fragment 370 obtained previously from a voice-to-text conversion (see FIG. 2, items 270*c*, 270*d*) may be displayed; the audio file for the speaking fragment 360 may also be replayed. Note that the three alternative positions of the play head 310 are presented in FIG. 3 are for illustration purposes and that only one instances of the play head 310 may appear on the channel timeline at any particular time.

Figure 4:
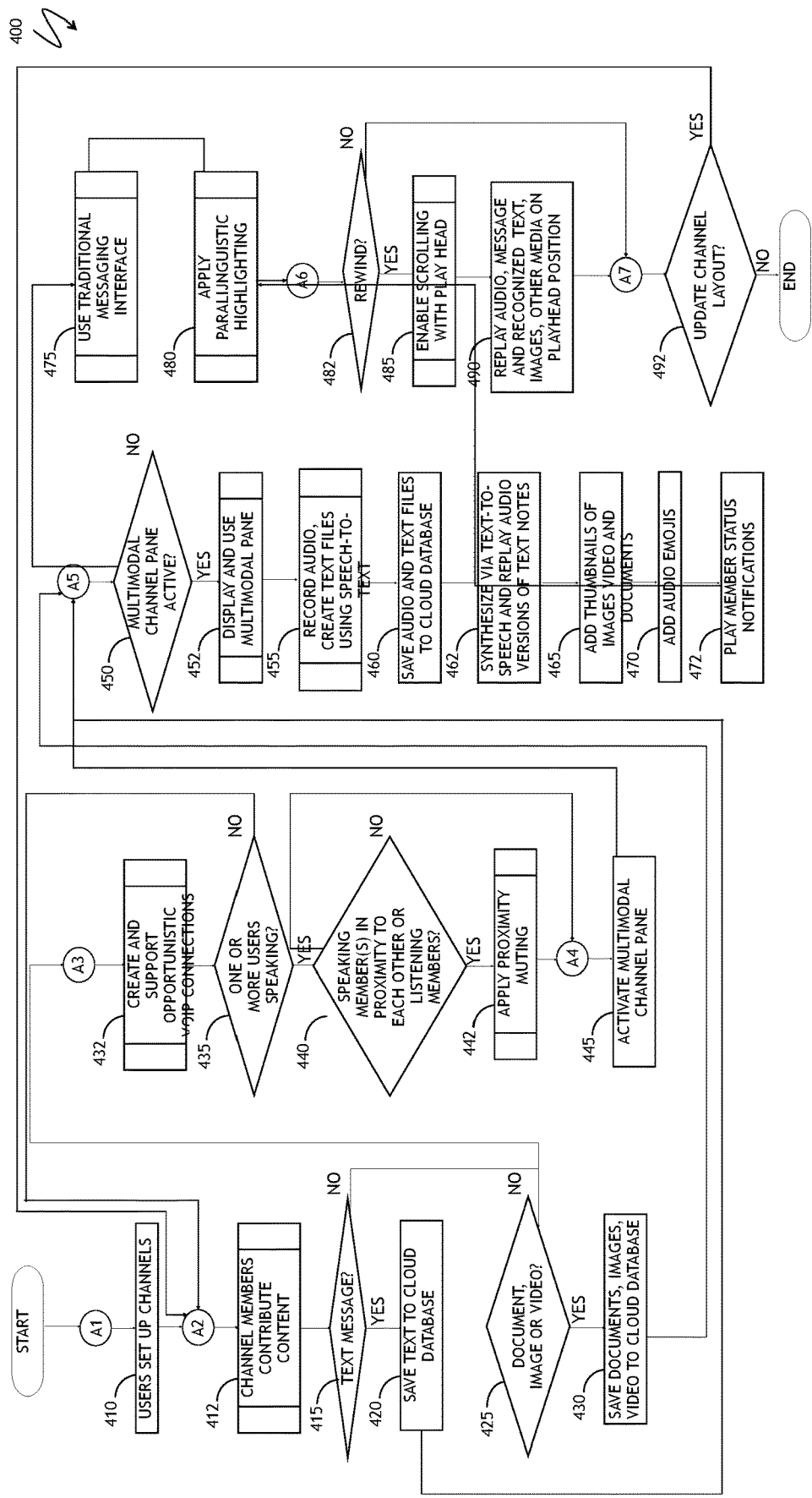
FIG. 4 is a system flow diagram illustrating system functioning in connection with continuous multimodal channel-based communications, according to an embodiment of the system described herein.

Referring to FIG. 4, a system flow diagram 400 illustrates system functioning in connection with continuous multimodal channel-based communications. Processing starts at a step 410, where system users set up channels, as explained elsewhere herein. After the step 410, processing proceeds to a step 412, where channel members contribute content to the system. After the step 412, processing proceeds to a test step 415, where it is determined whether the contributed content is a text message. If so, processing proceeds to a step 420, where the text is saved to the cloud database. Otherwise, processing proceeds to a test step 425, where it is determined whether the contributed content is a document, image or a video content/file. If so, processing proceeds to a step 430, where the document, image or video content is saved to the cloud storage. If it is determined at the test step 425 that the contributed content is not a document, image or video, processing proceeds to a step 432 where the system creates and supports opportunistic VOIP (voice over IP) connections. After the step 432, processing proceeds to a test step 435 where it is determined, whether one or more users are speaking. If not, processing proceeds back to the step 412 for subsequent content contribution (note that the step 412 may be independently reached from the step 410). Otherwise, processing proceeds to a test step 440, where it is determined whether one or more speaking channel members are in proximity to other speaking members or to listening channel members. If so, processing proceeds to a step 442, where proximity muting is applied, so that channel members in physical proximity are listening to live talk and where a slightly delayed channel rendering of speaker voice(s) is muted, as explained elsewhere herein. After the step 442, processing proceeds to a step 445, where a multimodal channel pane is activated. Note that the step 445 may be independently reached from the test step 440 if it was determined at the test step 440 that there are no listening or other speaking members in proximity to any other speaking member.

After the step 445, processing proceeds to a test step 450, which can be independently reached from the steps 420, 430, described above. At the step 450 it is determined whether the multimodal channel pane is active. If so, processing proceeds to a step 452 where the multimodal user pane is displayed and used by all channel members who currently have access to devices capable of visualizing the pane, as explained elsewhere herein. After the step 452, processing proceeds to a step 455, where audio files are recorded and text files are created using a speech-to-text feature, as explained elsewhere herein, including FIG. 2. After the step 455, processing proceeds to a step 460, where audio and text files representing voice communications are saved to the cloud database, as explained elsewhere herein. After the step 460, processing proceeds to a step 462, where audio versions of text notes are synthesized using a text-to-speech feature (see, for example, item 270*a* in FIG. 2) and are read aloud (replayed) to each listening channel member.

After the step 462, processing proceeds to a step 465, where thumbnails of images and documents that were contributed to the system while the multimodal channel pane was open are added (attached) to relevant lanes that belong to the appropriate channel members. After the step 465, processing proceeds to a step 470, where channel members add audio emojis, as explained elsewhere herein. After the step 470, processing proceeds to a step 472, where the system plays channel member status notifications as the members join and leave the channel, as explained elsewhere herein (see, for example item 250*i* in FIG. 2 and the accompanying text). After the step 472, processing proceeds to a step 480, where the content is analyzed and paralinguistic highlighting is applied, as explained elsewhere herein.

If it was determined at the test step 450 that the multimodal channel pane is inactive, processing proceeds from the test step 450 to a step 475, where a traditional messaging interface is used (such as displayed in the channel interface area 240 in FIG. 2). Following the step 475 or the step 480 is a test step 482, where it is determined whether any of the channel members rewinds the channel content. If so, processing proceeds to a step 485, where scrolling channel history with a play head is allowed, as explained elsewhere herein (see, in particular, FIG. 3 and the accompanying text for details). After the step 485, processing proceeds to a step 490, where the system replays audio, message and recognized text, images or other media at play head positions, as explained in more details in connection with FIG. 3. After the step 490, processing proceeds to a test step 492, where it is determined whether one or several users wish to update a channel layout. Note that the step 492 may be independently reached from a test step 482 if it was determined at the test step 482 that none of the users rewinds the channel content. If it is determined at the test step 492 that one or several users wish to update a channel layout, processing proceeds back to the channel setup step 410. Otherwise, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations, messaging sessions and functions of diverse system components may vary from the illustrations presented herein. Further, various aspects of the system described herein may be deployed on various devices, including, but not limited to smartphones, tablets and other mobile computers. Smartphones may use operating system(s) selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing interactive communication between a plurality of members, comprising:
providing a routing and redistribution module that communicatively connects each of the members with each of the other members and allows the members to receive at least real-time audio data from other ones of the members;
receiving content from at least one of the members, wherein the content includes at least one of: text messages, images, documents, graphical emojis, stickers, animated gifs, audio emojis, recorded audio, recorded video, real-time audio, and real-time video;
selectively distributing the content to at least some of the members in real-time, wherein distribution of the content to a particular one of the members varies according to a listening state of the particular one of the members;
selectively storing at least some of the content; and
visually indicating temporal relationships between different types of the content to at least one of the members, wherein at least some of the content that is selectively stored is distributed to at least some of the members after the content has been stored and wherein a visual indication of the temporal relationships between different types of the content is provided for the content that is selectively distributed to at least some of the members after the content has been stored.

2. A method of providing interactive communication between a plurality of members, comprising:
providing a routing and redistribution module that communicatively connects each of the members with each of the other members and allows the members to receive at least real-time audio data from other ones of the members;
receiving content from at least one of the members, wherein the content includes at least one of: text messages, images, documents, graphical emojis, stickers, animated gifs, audio emojis, recorded audio, recorded video, real-time audio, and real-time video;
selectively distributing the content to at least some of the members in real-time, wherein distribution of the content to a particular one of the members varies according to a listening state of the particular one of the members;
selectively storing at least some of the content; and
visually indicating temporal relationships between different types of the content to at least one of the members, wherein selectively distributing the content to at least some of the members in real-time includes muting real-time audio distribution from a first member to a second member in response to the first member being in close physical proximity to the second member.

3. A method, according to claim 2, wherein a visual indication of the temporal relationships between different types of the content is provided for the content that is selectively distributed to at least some of the members as the content is being generated.

4. A method, according to claim 2, wherein a type of content provided to a particular member depends on a type of device the particular member is using and on preferences set by the particular member.

5. A method, according to claim 4, wherein the type of device of the particular member is one of: a mobile phone, a wearable device, a smart headphone device, a portable device with a combination of personal audio output and input, a smart speaker, a smart TV, a tablet computing device, a desktop computer, a notebook computer, a set-top box, a game console, and an audio and video conferencing system.

6. A method, according to claim 2, wherein real-time audio provided as content by each of the members is converted to text that is delivered as content to at least some of the members and is stored.

7. A method, according to claim 2, wherein text provided as content by each of the members is converted to audio that is delivered as content to at least some of the members and is stored.

8. A method, according to claim 2, wherein selectively storing at least some of the content includes storing at least some of: documents, video recordings, audio recordings, text messages, metadata generated by the members, real-time audio that is converted to text, and text provided that is converted to audio data.

9. A method of providing interactive communication between a plurality of members, comprising:
providing a routing and redistribution module that communicatively connects each of the members with each of the other members and allows the members to receive at least real-time audio data from other ones of the members;
receiving content from at least one of the members, wherein the content includes at least one of: text messages, images, documents, graphical emojis, stickers, animated gifs, audio emojis, recorded audio, recorded video, real-time audio, and real-time video;

selectively distributing the content to at least some of the members in real-time, wherein distribution of the content to a particular one of the members varies according to a listening state of the particular one of the members;
selectively storing at least some of the content; and
visually indicating temporal relationships between different types of the content to at least one of the members, wherein the members are communicatively connected by at least one channel that maintains continuous communication between the members to allow content to be sent on the channel by a member at any time and wherein a predictive algorithm optimizes a real-time connection between the members by predicting when the members will communicate synchronously based at least on metadata corresponding to each of the members.

10. A method, according to claim 9, wherein the predictive algorithm establishes a real-time connection between the members prior to the members communicating with each other.

11. A method, according to claim 10, wherein the predictive algorithm is a trained model.

12. A method, according to claim 11, wherein the metadata includes at least one of: member location, ambient sonic environment, proximity to other members, a device type of each of the members, temperature, mobility of each of the members, battery level, data network environment, cellular reception characteristics, barometric pressure, and ambient light.

13. A method, according to claim 9, wherein in response to a first one of the members and a second one of the members opening a client application that accesses the channel, connecting listening devices to devices of the first and second members, experiencing relatively low ambient background noise, and having a previous history of communicating at a particular time, the predictive algorithm establishes a real-time connection between the first and second members.

14. A method, according to claim 13, wherein the predictive algorithm disconnects the first and second members in response to the first and second members not using the real-time connection.

15. A method of providing interactive communication between a plurality of members, comprising:
providing a routing and redistribution module that communicatively connects each of the members with each of the other members and allows the members to receive at least real-time audio data from other ones of the members;
receiving content from at least one of the members, wherein the content includes at least one of: text messages, images, documents, graphical emojis, stickers, animated gifs, audio emojis, recorded audio, recorded video, real-time audio, and real-time video;
selectively distributing the content to at least some of the members in real-time, wherein distribution of the content to a particular one of the members varies according to a listening state of the particular one of the members;
selectively storing at least some of the content; and
visually indicating temporal relationships between different types of the content to at least one of the members, wherein at least some of the content that is selectively stored is distributed to at least some of the members after the content has been stored, wherein a subset of members having devices with visual capability are provided with a visual representation of participation indicating when each of the members was listening and when each of the members was speaking and wherein the visual representation shows content that is being added to the visual representation as synchronous content is being generated and includes asynchronous content that is added to the visual representation at any time after being generated.

16. A method, according to claim 15, wherein the visual representation corresponds to a line for each of the members with different segments of the line representing different times and wherein a first segment corresponding to a range of time that a particular one of the members was not listening is visually different than a second segment corresponding to a range of time that the particular one of the members was listening.

17. A method, according to claim 15, wherein the visual representation corresponds to a line for each of the members with different segments of the line representing different times and wherein a first segment corresponding to a range of time that a particular one of the members was not speaking is different than a second segment corresponding to a range of time that the particular one of the members was speaking.

18. A method, according to claim 15, wherein at least one of the members adds content while some of the members are speaking and listening.

19. A method, according to claim 18, wherein icons that represent different types of content are superimposed on the visual representation of participation.

20. A method, according to claim 19, wherein the icons represent at least one of: text messages, images, documents and audio emojis.

21. A method, according to claim 20, wherein the audio emojis visually and audibly represent attitudinal and emotive information corresponding to real-time audio content.

22. A method, according to claim 20, wherein the visual representation of participation is manipulated by the member to play back portions of a real-time audio conversation and portions of the content corresponding to at least one of: text messages, images, documents and audio emojis.

23. A method, according to claim 15, wherein the visual representation of participation is manipulated by the member to play back portions of a real-time audio conversation using at least some of the content that is stored.

24. A method, according to claim 23, wherein at least a portion of real-time audio conversation that is played back is viewed as text that had been converted from real-time audio input.

25. A method, according to claim 23, wherein at least a portion of real-time audio conversation that is played back is supplemented by audio information corresponding to text that had been input during the conversation and converted from text to audio content.

26. A non-transitory computer-readable medium containing software that provides interactive communication between a plurality of members, the software comprising:
a routing and redistribution module that communicatively connects each of the members with each of the other members and allows the members to receive at least real-time audio data from other ones of the members;
executable code that receives content from at least one of the members, wherein the content includes at least one of: text messages, images, documents, graphical emojis, stickers, animated gifs, audio emojis, recorded audio, recorded video, real-time audio, and real-time video;
executable code that selectively distributes the content to at least some of the members in real-time, wherein distribution of the content to a particular one of the members varies according to a listening state of the particular one of the members;

executable code that selectively stores at least some of the content; and executable code that visually indicates temporal relationships between different types of the content to at least one of the members, wherein selectively distributing the content to at least some of the members in real-time includes muting real-time audio distribution from a first member to a second member in response to the first member being in close physical proximity to the second member.

* * * * *